UNITED STATES PATENT OFFICE.

JOSEPH W. RICHARDS AND CHARLES W. ROEPPER, OF BETHLEHEM, PENNSYLVANIA, ASSIGNORS TO THE AMERICAN ELECTROLYTIC COMPANY OF DELAWARE.

PROCESS OF MANUFACTURING METALLIC CARBONATES BY ELECTROLYSIS.

SPECIFICATION forming part of Letters Patent No. 644,779, dated March 6, 1900.

Application filed July 6, 1897. Serial No. 643,541. (No specimens.)

*To all whom it may concern:*

Be it known that we, JOSEPH W. RICHARDS, a subject of the Queen of Great Britain, and CHARLES W. ROEPPER, a citizen of the United States, both residents of Bethlehem, in the State of Pennsylvania, have invented a certain new and useful Process of Manufacturing Metallic Carbonates by Electrolysis, whereof the following is a specification.

Our invention is addressed to the electrolytic production of metallic carbonates either alone or in conjunction with hydrated oxids, a typical and familiar instance of such composite product being the white lead of commerce.

In addition to the numerous purely-chemical processes for the manufacture of white lead and other carbonates it has hitherto been suggested to employ electrolytic action as an adjunct to the chemical reaction. Thus, for instance, a carbonate in solution has been employed as an electrolyte, and upon its decomposition by the current the carbonic acid which as such was contained therein was disengaged and permitted to attack the metal base. So also electrolytically-formed acetates have been subjected to the action of carbonic-acid gas either electrolytically disengaged by the decomposition of a soluble carbonate or generated externally and introduced into the acetate solution. All such processes, however, of which we are aware have been based either upon the disengagement of carbonic-acid gas from a previously-formed carbonate or upon its mechanical introduction in gaseous form to the substance which was to be attacked.

Our process is based upon the discovery that certain organic substances, such as acetic acid, can be split up by electrolytic action and that carbonic acid can be thus generated in such relation to the metal of the anode as to form a carbonate therefrom. This electrolytic generation of the carbonic acid by the destruction of an organic substance as distinguished from the disengagement of the acid from a carbonate or from its mechanical introduction is the characteristic feature of our invention, and we utilize this discovery for the manufacture of carbonates with great economy. By the addition of other ingredients which are capable under electrolysis of supplying the elements necessary to produce an oxid or hydrated oxid we are enabled to extend the attack upon the metal so as to yield a composite product whose proportions can be controlled by varying the ratios of the several ingredients.

The most obvious commercial application of our process is the production of white lead, which, as is well known, consists of closely-intermingled carbonate of lead and hydrated oxid of lead, the proportions varying within certain limits; but approximately the composition may be stated as follows: carbonate of lead, sixty-nine per cent. hydrated oxid of lead, thirty-one per cent.

We will now describe as a typical embodiment of our invention its adaptation to the manufacture of white lead.

We preferably employ acetic acid as the reagent whose electrolytic decomposition shall generate carbonic-acid gas to form the carbonate, and we have found sulfite of sodium to be a reagent whose decomposition furnishes the elements under proper conditions to obtain the hydrated oxid. The acetic acid should be used in some combined form, such as acetate of sodium, and any substantial excess of free acid in the solution must be avoided. We take a mixed solution of acetate of sodium and sulfite of sodium, the proportions being, say, ten grams of acetate of sodium and one-quarter gram of sulfite of sodium per liter. A five-per-cent. solution is at ordinary temperature a proper strength to use. With this electrolyte we employ an anode composed of metallic lead in any shape suitable for the advantageous exposure of its surface to the attack of the liberated elements. In the simple type of the process, where a direct or non-alternating current is employed, the cathode should be of some substance, such as carbon, which is not attacked under the conditions of use. A very slight addition of nitrate of potassium may be made to the electrolyte—say one gram to the liter—in order that the liberation of the nitric-acid radical at the anode may lead the attack upon the lead. This, however, is an incident to the process and not an essential characteristic thereof. Under the above conditions we subject the electrolyte to a current of about five volts with a density of from one hundred to two hundred amperes per square meter of anode surface. As a result the acetate of sodium is decomposed and the acetic acid simultaneously split up with the generation of carbonic acid in the region of the anode which combines with the lead and forms carbonate of lead. Simultaneously the decomposition of the sulfite of sodium supplies oxygen in the region of the anode and leads to the formation of hydrated oxid of lead independent of but intermingled with the carbonate. The formation is abundant, and the two products fall off together freely from the anode in the form of white powder and may be collected, dried, and washed or otherwise prepared for final use. As the acetic acid in the electrolyte is depleted fresh additions thereof are made from time to time, care being taken that no substantial excess of free acid shall exist in the solution. We have found that the sulfite of sodium is not practically depleted, owing probably to the recombination of its essential constituents. Thus the process becomes a practically continuous one until the anode has been attacked to the desired extent.

We have referred to acetic acid as the preferred organic substance whose decomposition is utilized for the generation of the carbonic acid necessary; but we do not limit ourselves to the use of this particular substance, since other organic acids—such as tartaric, formic, &c.—are capable of generating carbonic acid at the anode by electrolysis. So, also, other substances than sulfites can be employed to furnish oxygen at the anode simultaneously with the generation of carbonic acid thereat. Hence we do not limit our claim to the use of the specific substances above mentioned nor of course to the manufacture of white lead as the only embodiment of our process.

Having thus described our invention, we claim—

1. The hereinbefore-described process of manufacturing metallic carbonates by electrolysis, which consists in employing an anode of the metal whose carbonate is to be formed and an electrolyte containing a salt of an organic acid and passing through the electrolyte a current of such character as to split up said acid and generate carbonic acid as a resultant in the region of the anode, which, in combination with the metal of the anode, forms the desired carbonate, substantially as described.

2. The hereinbefore-described process of manufacturing metallic carbonates in conjunction with oxids of a similar metal by electrolysis, which consists in employing an anode of the metal whose combined carbonate and oxid are to be produced; and an electrolyte containing a salt of an organic acid and also an oxidizing reagent; and passing through the electrolyte a current of such character as to split up said organic acid, and as a resultant generate carbonic acid in the region of the anode, which, in combination with the metal of the anode, forms the desired carbonate, while the decomposed oxidizing reagent evolves oxygen which simultaneously combines with the metal of the anode, substantially as described.

3. The hereinbefore-described process of manufacturing carbonate of lead by electrolysis, which consists in employing an anode of lead and an electrolyte containing an acetate, and passing through the electrolyte a current of such character as to split up the acid radical of said acetate and to generate carbonic acid as a resultant in the region of the anode, which, in combination with the lead anode, forms carbonate of lead, substantially as described.

4. The hereinbefore-described process of manufacturing white lead by electrolysis, which consists in employing a lead anode and an electrolyte containing an acetate and also an oxidizing reagent; and passing through the electrolyte a current of such character as to split up the acid radical of said acetate and as a resultant generate carbonic acid in the region of the anode, which, in combination with the anode, forms carbonate of lead, while the decomposed oxidizing reagent evolves oxygen, which, simultaneously combining with the lead anode, forms hydrated oxid of lead intermingled with the carbonate, substantially as described.

JOSEPH W. RICHARDS.
CHARLES W. ROEPPER.

Witnesses as to Joseph W. Richards:
  E. REESE,
  JAMES H. BELL.
Witnesses as to Charles W. Roepper:
  C. H. SCHWARTZ,
  G. HERBERT JENKINS.